United States Patent
DeLay et al.

(10) Patent No.: US 11,451,492 B2
(45) Date of Patent: Sep. 20, 2022

(54) METHODS, SYSTEMS, AND APPARATUSES FOR ENHANCED PARALLELISM OF TIME-TRIGGERED ETHERNET TRAFFIC USING INTERFERENCE-COGNIZANT NETWORK SCHEDULING

(71) Applicant: HONEYWELL INTERNATIONAL INC., Charlotte, NC (US)

(72) Inventors: Benjamin F. DeLay, Cave Creek, AZ (US); William T. Smithgall, League City, TX (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 42 days.

(21) Appl. No.: 17/130,624

(22) Filed: Dec. 22, 2020

(65) Prior Publication Data
US 2022/0200931 A1 Jun. 23, 2022

(51) Int. Cl.
*H04L 49/00* (2022.01)
*H04L 47/50* (2022.01)
(Continued)

(52) U.S. Cl.
CPC ............ *H04L 49/70* (2013.01); *H04L 47/50* (2013.01); *H04L 49/254* (2013.01); *H04L 49/354* (2013.01)

(58) Field of Classification Search
CPC ....... H04L 49/70; H04L 47/50; H04L 49/254; H04L 49/354
See application file for complete search history.

(56) References Cited

U.S. PATENT DOCUMENTS 8,059,652 B2    11/2011   Mushtaq et al.
8,503,484 B2     8/2013   Bonk et al.
(Continued)

FOREIGN PATENT DOCUMENTS

CN    105227497 A    1/2016
CN    107257311 A    10/2017
(Continued)

OTHER PUBLICATIONS

Tamas-Selicean, Domitian, et al. "Synthesis of Communication Schedules for TTEthernet-Based Mixed-Criticality Systems," Presented at the 10th International Conference on Hardware/Software Codesign and System Synthesis CODES+ISSS 2012, part of the Eighth Embedded Systems Week, ACM, 2012.
(Continued)

*Primary Examiner* — Wutchung Chu
(74) *Attorney, Agent, or Firm* — Lorenz & Kopf, LLP (57) ABSTRACT

Methods, systems, and apparatuses for scheduling a plurality of Virtual Links (VLs) in a Time-Triggered Ethernet (TTE) network by pre-processing, by a scheduling algorithm implemented by a Network Scheduling Tool (NST), VL information prior to initiating a scheduling procedure by, detecting VL information associated with VLs that having common physical resources that include a common direction of a switching port or an egress end system port; and storing the VL information associated with the set of VLs for retrieval by the NST to parse a VL list for scheduling to determine one or more conflicting VLs in functionalities with a VL that is to be scheduled by a first pass that attempts favoring scheduling a VL into a bin when previously scheduled VLs fail to exhibit conflicts; and a second pass that attempts to resolve at least one conflict exhibited in the scheduling procedure by offsetting a transmit time.

16 Claims, 7 Drawing Sheets

(51) Int. Cl.
*H04L 49/253* (2022.01)
*H04L 49/354* (2022.01)

(56) References Cited

U.S. PATENT DOCUMENTS

| | | | |
|---|---|---|---|
| 8,634,305 B2 | 1/2014 | Smithgall et al. | |
| 8,705,527 B1* | 4/2014 | Addepalli | H04W 12/03 370/389 |
| 9,596,187 B2* | 3/2017 | Ma | H04L 12/40 |
| 10,581,758 B2 | 3/2020 | Thayalan et al. | |
| 2009/0323704 A1* | 12/2009 | Hall | H04L 12/4625 370/401 |
| 2013/0332926 A1* | 12/2013 | Jakoljevic | G06F 9/45533 718/1 |
| 2015/0078399 A1* | 3/2015 | Poledna | H04J 3/0655 370/419 |
| 2015/0295843 A1* | 10/2015 | Ma | H04L 12/40 370/412 |
| 2016/0294697 A1* | 10/2016 | Varadarajan | H04L 47/28 |
| 2016/0294720 A1* | 10/2016 | Varadarajan | H04L 47/58 |
| 2016/0294721 A1* | 10/2016 | Varadarajan | H04L 41/0869 |
| 2017/0070439 A1* | 3/2017 | Craciunas | H04L 12/413 |
| 2019/0056735 A1* | 2/2019 | Koopman | G05D 1/0077 |
| 2021/0073689 A1* | 3/2021 | Finzi | H04L 69/28 |
| 2021/0351979 A1* | 11/2021 | DeLay | H04L 41/0889 |
| 2022/0124020 A1* | 4/2022 | Hellmanns | H04L 45/02 |

FOREIGN PATENT DOCUMENTS

| | | |
|---|---|---|
| CN | 109890082 A | 6/2019 |
| CN | 111049667 A | 4/2020 |
| WO | 2017/049938 A1 | 3/2017 |

OTHER PUBLICATIONS

Delay, Benjamin, et al., U.S. Appl. No. 16/867,628, filed May 6, 2020.

Delay, Benjamin, et al., U.S. Appl. No. 16/554,128, filed Aug. 28, 2019.

Delay, Benjamin, et al., U.S. Appl. No. 16/554,210, filed Aug. 28, 2019.

Delay, Benjamin, et al., U.S. Appl. No. 16/554,280, filed Aug. 28, 2019.

Sanjoy Baruah, et al; Certification-cognizant time-triggered scheduling of mixed-criticality systems; 2011 32nd IEEE Real-Time Systems Symposium; Nov. 29, 2011 (Nov. 29, 2011), pp. 3-12.

* cited by examiner

METHODS, SYSTEMS, AND APPARATUSES FOR ENHANCED PARALLELISM OF TIME-TRIGGERED ETHERNET TRAFFIC USING INTERFERENCE-COGNIZANT NETWORK SCHEDULING

CROSS-REFERENCE TO RELATED APPLICATIONS

The subject matter described here is related to the subject matter described in U.S. patent application Ser. No. 17/130,782 entitled "METHODS, SYSTEMS, AND APPARATUSES FOR PRIORITY-BASED TIME PARTITIONING IN TIME-TRIGGERED ETHERNET NETWORKS," filed concurrently herewith.

TECHNICAL FIELD

The present disclosure generally relates to methods, systems, and apparatuses for scheduling in time-triggered Ethernet (TTE) networks, and more particularly to data flows and functionality to detect and track physical resource contentions for Virtual Links (VLs) in a network prior to the scheduling of the VLs in the TTE network.

BACKGROUND

The growing data needs of TTE networks have stressed the implementation of current algorithms, and these algorithms regularly fail to converge on a valid global schedule for proper traffic throughput in the TTE network. The TTE network is based on routing ethernet frames through isolated data tunnels referred to as VLs. The VLs are multicast trees, each tree enabling data transmission between one and only one end of the TTE network to several other ends. When using multiple VLs deployed for exchanging data within and between avionics systems, the multiple VLs are deployed with a reserved amount of bandwidth. The design of the VLs enables data exchanges between partitions located on different modules that require tunneling through VLs in which a dedicated VL is configured for each communication flow. For efficient tunneling, a selection of particular transmission parameters is required that affects the overall timing properties and the bandwidth allocation of the VL and enables a path between the source (producer) and the receivers.

To schedule each VL, the scheduling algorithm of the NST sorts the VLs based on transmit rate, size, and latency constraints. For each rate, the tightest-constrained VLs are scheduled first. This approach may assume that rate and latency requirements track closely and inversely. Still, data sets have since been presented to the algorithm that exhibits many instances of low-rate, low-latency data, violating these basic assumptions. These data sets are difficult to schedule with the current algorithmic approaches to time slot selection, and scheduling attempts fail to produce a valid network schedule with all requested VL traffic included.

The serialization of VLs that share physical resources because of the use of switched interlink connectivity in the TTE network leads to serialized VLs occupying common physical resources that block new VLs from being successfully scheduled. Hence, there is a need for methods, systems, and apparatuses for scheduling in TTE networks to increase TTE network resources' parallel usage to enhance the throughput capability in the interlinked TTE network to schedule a more significant number of VLs and more efficiently utilize the equipment.

Other desirable features and characteristics will become apparent from the subsequent detailed description and the appended claims, taken in conjunction with the accompanying drawings and the foregoing technical field and background.

BRIEF SUMMARY

Methods, systems, and apparatuses are provided for scheduling a plurality of VLs in a TTE network.

In an exemplary embodiment, a method for pre-processing scheduling of Virtual Links (VLs) contained in a Time-Triggered Ethernet (TTE) network in predefined priority order for use by a Network Scheduling Tool (NST) is provided. The method includes pre-processing, by a scheduling algorithm implemented by the NST, VL information prior to initiating a scheduling procedure of a set of VLs, the pre-processing including the steps of:

detecting, by the scheduling algorithm implemented by the NST, VL information associated with the set of VLs that utilize one or more common physical resources of the TTE network wherein the one or more common physical resources at least include a common direction of a switching port or an egress end system port; and storing, by the scheduling algorithm implemented by the NST, the VL information associated with the set of VLs in a memory for retrieval by the NST to parse a VL list for scheduling by the scheduling algorithm to determine one or more conflicting VLs in functionalities during the scheduling procedure.

In various exemplary embodiments, a method is provided that includes performing, by scheduling the NST, a two-pass procedure of the set of VLs by the scheduling algorithm for identifying and prioritizing a physical resource contention between the set of VLs.

The method further includes scheduling, by the scheduling algorithm of the NST, a first pass of the two-pass procedure of the set of VLs that attempts favoring scheduling a VL into a bin when previously scheduled VL fails to exhibit conflicts with the VL that is to be scheduled.

The method further includes scheduling, by the scheduling algorithm of the NST, a second pass of the two-pass procedure of the set of VLs that attempts to resolve at least one conflict exhibited in the scheduling procedure by off-setting a transmit time of the VL that is to be scheduled.

The method further includes configuring the NST with conflict detection logic, including a double-sided timing window for resolving a physical resource conflict between the VL that is to be scheduled and each VL already scheduled in the bin.

The method further includes the double-sided timing window that includes a transmit range defined by a transmit-no-earlier-than time and a transmit-no-later-than time.

The method further includes aggregating, by the scheduling algorithm implemented by the NST, a plurality of summing ranges wherein each summing range is defined by a set of aggregated non-conflicting timing windows between a VL that is to be scheduled, and a set including previously scheduled VLs and conflicting VLs within a bin.

The method further includes determining, by the scheduling algorithm implemented by the NST, in each summing range a location for placement of the VL that is to be scheduled within the bin.

The method further includes excluding, by the scheduling algorithm implemented by the NST, one or more destination ports with conflicts determined by the conflict detection logic.

The method further includes, in response to the exclusion of conflicting destination ports, queuing by the scheduling algorithm implemented by the NST a set of egress VLs at switch ports for servicing a destination end system while preserving a high-fidelity conflict detection and resolution pertaining to each set of switch interlink ports.

The method further includes determining, by the scheduling algorithm implemented by the NST, a worst-case serialization delay based on a link rate at an excluded conflicted destination port, of approximately all existing scheduled traffic at a specific port in the bin which is in proximity to an end of the bin wherein if a scheduled VL causes a queuing delay extending beyond a bin boundary, then not proceeding to schedule the VL within the bin.

The method further includes allowing, by the scheduling algorithm implemented by the NST, a tolerance of a more considerable queuing delay if the scheduling of a serialized transmission to a destination end system of a final VL that is scheduled at the end of a bin has already been initiated but has yet been completed.

The method further includes post-scheduling, by the scheduling algorithm implemented by the NST, by parsing a priority-sorted list for discovering a VL of a set of VLs that do not conflict with a just scheduled VL or any previously scheduled VLs within the bin, wherein the scheduling algorithm places any non-conflicting VLs in the same bin as a just-scheduled VL if the bin represents a valid placement for the VL based on input system timing constraints.

In another exemplary embodiment, a system for pre-processing scheduling of Virtual Links (VLs) contained in a Time-Triggered Ethernet (TTE) network in predefined priority order for use by a Network Scheduling Tool (NST) is provided. The system includes the NST configured to: pre-process VL information prior to initiating a scheduling procedure of a set of VLs to detect VL information associated with the set of VLs that utilize one or more common physical resources of the TTE network wherein the one or more common physical resources at least include a common direction of a switching port or an egress end system port; and store the VL information associated with the set of VLs in a memory for retrieval by the NST to parse a VL list for scheduling by the scheduling algorithm to determine one or more conflicting VLs in functionalities during the scheduling procedure.

In various exemplary embodiments, the system includes the NST further configured to: perform a two-pass procedure by the scheduling algorithm to identify and prioritize a physical resource contention between a set of VLs wherein a first pass of the two-pass procedure attempts to favor to schedule a VL into a bin when a previously scheduled VL fails to exhibit a conflict with the VL that is to be scheduled wherein a second pass of the two-pass procedure of the set of VLs attempts to resolve any conflicts by the offset of a transmit time of the VL that is to be scheduled.

The system further includes the NST configured to: provide conflict detection logic, including a double-sided timing window for resolving a physical resource conflict between the VL that is to be scheduled and each VL already scheduled in the bin wherein the double-sided timing window includes a transmit range defined by a transmit-no-earlier-than time and a transmit-no-later-than time; and aggregate by the scheduling algorithm, by summing ranges defined by aggregated non-conflicting timing windows between a VL that is to be scheduled, and all of the previously scheduled and conflicting VLs within a bin to determine a location for placement of the VL in the bin.

The system further includes the NST configured to: exclude by the scheduling algorithm one or more destination ports with conflicts via the conflict detection logic. In response to the exclusion of conflicting destination ports, queuing by the scheduling algorithm of a set of egress VLs at switch ports servicing a destination end system while preserving a high-fidelity conflict detection and a resolution pertaining to each set of switch interlink ports; and determined by the scheduling algorithm, a worst-case serialization delay based on a link rate at an excluded conflicted destination port, of all existing scheduled traffic at that specific port in the bin, that is in proximity to an end of the bin wherein if the to be scheduled VL causes a queuing delay which extends beyond a bin boundary, then not scheduling the VL in the bin, and allow by the scheduling algorithm a tolerance of a more considerable queuing delay if the scheduling of a serialized transmission to a destination end system of a final VL that is to be scheduled at the end of a bin has already been initiated but has not yet been completed.

The system further includes the NST configured to post-schedule, by the scheduling algorithm, to parse a priority-sorted list to discover a VL of a set of all VLs that do not conflict with a just scheduled VL or any previously scheduled VLs in the bin, wherein a scheduling algorithm places any non-conflicting VLs in the same bin as a just-scheduled VL if the bin represents a valid placement for the VL based on input system timing constraints.

In yet another exemplary embodiment, an apparatus including a network scheduling tool (NST) for scheduling a plurality of Virtual Links (VLs) in a Time-Triggered Ethernet (TTE) network is provided. The apparatus includes the NST configured with a processor programmed by a set of instructions to schedule time-triggered traffic by pre-processing, by a scheduling algorithm of the NST, VL information prior to initiating a scheduling procedure of a group of VLs; detecting VL information associated with the group of VLs that utilize one or more common physical resources of the TTE network wherein the one or more common physical resources at least include a common direction of a switching port or an egress end system port; storing the VL information associated with the group of VLs in a memory for retrieval by the NST to parse a VL list for scheduling by the scheduling algorithm to determine one or more conflicting VLs in functionalities during the scheduling procedure; and performing a two-pass procedure by the scheduling algorithm for identifying and prioritizing a physical resource contention between a set of VLs.

In an exemplary embodiment, the apparatus further includes the NST configured with a processor programmed by a set of instructions to schedule time-triggered traffic by scheduling a first pass of the two-pass procedure of the set of VLs that attempts favoring scheduling a VL into a bin when previously scheduled VL fail to exhibit conflicts with the VL that is scheduled; and scheduling a second pass of the two-pass procedure of the set of VLs that attempts to resolve at least one conflict exhibited in the scheduling procedure by offsetting a transmit time of the VL that is scheduled.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, summary, or the following detailed description.

The embodiments described below enable an improved network scheduling tool (NST) to more efficiently utilize the underlying network hardware's features and capabilities, such as improving network performance for such measures as latency, interference, etc. For example, the embodiments described below enable improved slot time allocation and improved traffic management. Thus, when implemented by the underlying hardware, the schedule and configuration parameters generated by embodiments of the NST described herein result in improved network performance. The various features of the NST described herein can be used together or individually depending on the features and capabilities of the underlying network hardware.

In various exemplary embodiments, the present disclosure describes methods, systems, and apparatuses using a global network timeline of a scheduling procedure divided into bins, and VLs that need to be scheduled are sorted in predefined priority order. This scheduling procedure involves a transmit rate, latency requirements, payload size, and traversal length. A pre-processing step before scheduling the VLs detects and stores VL information for VLs that utilize the same physical network resources such as switch ports. In this procedure, physical resource contention information can be stored for each VL. The scheduling algorithm can quickly parse the VL list and determine other conflicting VLs for functionality later in the scheduling process. The results of this pre-processing step can be implemented in a variety of ways, including using the aggregated number of conflicting VLs detected for a single VL to favor scheduling VLs with greater or fewer numbers of conflicts first in the sort order, creating groups of VLs with identical conflicting patterns, creating groups of VLs with mutually exclusive conflicting patterns, or any number of other pre-scheduling data manipulations to improve the capability of the scheduling algorithm concerning identifying and prioritizing the treatment of physical resource contention between VLs.

In various exemplary embodiments, the present disclosure describes methods, systems, and apparatuses that when the algorithm is configured to favor bins in which the VL to be scheduled contends with no VLs previously scheduled in the bin. The logic performs a two-pass scheduling approach utilizing the specified bin selection heuristic, including a spread-first, stack-first, demand prediction, or any other bin selection approach. The first pass through the sorted list of selected bins examines the VLs already scheduled in each bin. Using the previously stored VL resource contention information, the scheduler determines if any of the scheduled VLs present conflicts with the VL to be scheduled. If any conflicts are detected, the algorithm moves to the next bin in the bin selection list. Suppose there are not any non-conflicting bin locations that are identified. In that case, the algorithm parses the bin selection list again, in the same order, using conflict resolution logic to offset the VL to be scheduled in time such that the physical resource contention does not cause packet collisions and queuing delays along the route.

In exemplary embodiments, the present disclosure describes methods, systems, and apparatuses with features used to enhance parallelism in the schedule and introduce a post-scheduling step. When a valid schedule location for a VL is found in a bin, the algorithm parses the sorted VL list to find VLs that have not yet been scheduled. The algorithm uses the previously stored VL resource contention information to identify VLs that do not conflict with the just-scheduled VL and attempts to schedule those VLs in the same bin in which the just-scheduled VL was placed. The option to only try to place VLs in the same bin that does not have conflicts with any of the existing scheduled VLs can be utilized in this post-scheduled procedure.

In various exemplary embodiments, the present disclosure describes methods, systems, and apparatuses with enhanced parallel scheduling capabilities by introducing temporal conflict resolution logic with two-sided timing windows. When the algorithm attempts to schedule a VL in a bin with other VLs already scheduled, physical resource contention can be detected between the two VLs. The enhanced conflict resolution logic then finds two times, a no-earlier-than constraint and a no-later-than constraint, at which the VL to be scheduled can be transmitted from the source end system such that the VL to be scheduled has passed by the point of resource contention before the already-scheduled VL, or the already-scheduled VL has passed by the point of resource contention before the VL to be scheduled. The two time constraint values establish a keep-out zone for each conflicting VL already scheduled in the bin. The two times are determined by finding the first and last resource contention points, and thus the physical length of the conflicting path, on the common route segments shared by the two VLs. The relative size of the VLs, hardware latencies, link propagation times, and synchronization precision are then used to determine the earliest and latest possible safe dispatch point that form the two sides of the conflict resolution window. A two-sided window is collected for each conflicting VL that is already scheduled in the bin, and the algorithm uses the aggregate two-sided constraint to determine where in the bin the VL to be scheduled can be safely placed. If the no-later-than constraint occurs before the start of the bin or the no-earlier-than constraints occurs too close to the end of the bin to allow the VL to traverse its entire route, the VL cannot be placed in the bin.

In various exemplary embodiments, the scheduling algorithm sorts the VLs based on transmit rate, size, and latency constraints. For each rate, the tightest-constrained VLs are scheduled first. The algorithms were initially designed to assume that rate and latency requirements track closely and inversely. Still, data sets have since been presented to the algorithm that exhibits many instances of low-rate, low-latency data, violating these basic assumptions. These data sets are difficult to schedule with the original algorithmic approaches to time slot selection, and scheduling attempts fail to produce a valid network schedule with all requested VL traffic included.

In various embodiments, enhancements to the algorithms' scheduling performance, conflict detection logic, and VL sorting implementations cause serialization of the TT VLs across network-wide slot reservations to maintain a minimum level of buffer utilization and transport latency across the network. The serialization of VLs that share physical resources, resulting from switch interlink connectivity, leads to serialized VLs occupying common physical resources that may block or prevent new VLs from being successfully scheduled. The methods described in this invention increase network resources' parallel usage to enhance the capability to schedule more significant VLs and more efficiently utilize the equipment.

In various exemplary embodiments, the present disclosure describes methods, systems, and apparatuses to introduce additional data flows and functionality to detect and track physical resource contention for all VLs in a network before scheduling the VLs. Later stages of the algorithm can then use the conflict information to perform a two-pass scheduling heuristic that favors scheduling a VL into a bin where no previously scheduled VLs conflict with the VL to be scheduled. An additional feature allows for a pre-scheduling step wherein the priority-sorted list of VLs is parsed to find all VLs that do not conflict with the just-scheduled VL, and the scheduler attempts to place each of those VLs in the same bin as the just-scheduled VL.

In various exemplary embodiments, the present disclosure describes methods, systems, and apparatuses that introduce enhanced conflict detection logic that provides a double-sided timing window (i.e., a transmit-no-earlier-than time and a transmit-no-later-than time) to resolve physical resource conflicts between the VL be scheduled potentially and each VL already scheduled in the bin. The NST (i.e., the scheduler) then uses the aggregate non-conflicting timing windows between a to-be-scheduled VL and all previously scheduled VLs within a bin to determine where in the bin the VL can be safely placed.

In various exemplary embodiments, the present disclosure describes methods, systems, and apparatuses to provide data flows and functionality that allows the scheduling algorithm to exclude destination port conflicts in the conflict detection logic. This capability allows queuing to occur at egress switch ports that are servicing a destination end system while preserving the high-fidelity conflict detection and resolution capability at switch interlink ports. The algorithm accounts for the worst-case serialization delay based on the link rate at the egress port, the existing scheduled traffic, and the proximity to the end of the bin. If the VL would cause a queuing delay that extends beyond the bin boundary, the VL is not scheduled in the bin.

Various exemplary embodiments allow a more considerable queuing delay tolerance wherein the final VL must begin, but not complete, serialized transmission to the destination end system prior to the end of the bin.

The U.S. patent application Ser. No. 16/554,280 assigned to Honeywell International Inc., Morris Plain, N.J. (US) is incorporated by reference and provides methods, systems, and apparatuses for optimizing the bin selection of a network scheduling and configuration tool (NST) by bin allocation, demand, prediction, and machine learning.

The issued U.S. Pat. No. 9,762,501 B2 to Varadarajan et al. also assigned to Honeywell International Inc., Morris Plain, N.J. (US), is incorporated by reference and provides systems and methods for systematic hybrid network scheduling for multiple traffic classes with host timing and phase constraints using a method of scheduling communications in a network that includes scheduling transmission of VLs pertaining to a first traffic class on a global schedule. In addition, to coordinate transmission of the Virtual Links pertaining to the first traffic class across all transmitting end stations on the global schedule. Also, the scheduling of transmission of each VL pertaining to a second traffic class on a local schedule of the respective transmitting end station from which each respective VL pertaining to the second traffic class is transmitted where the transmission of each VL pertaining to the second traffic class is coordinated only at the respective end station from which each respective VL pertaining to the second traffic class is transmitted.

Figure 1:
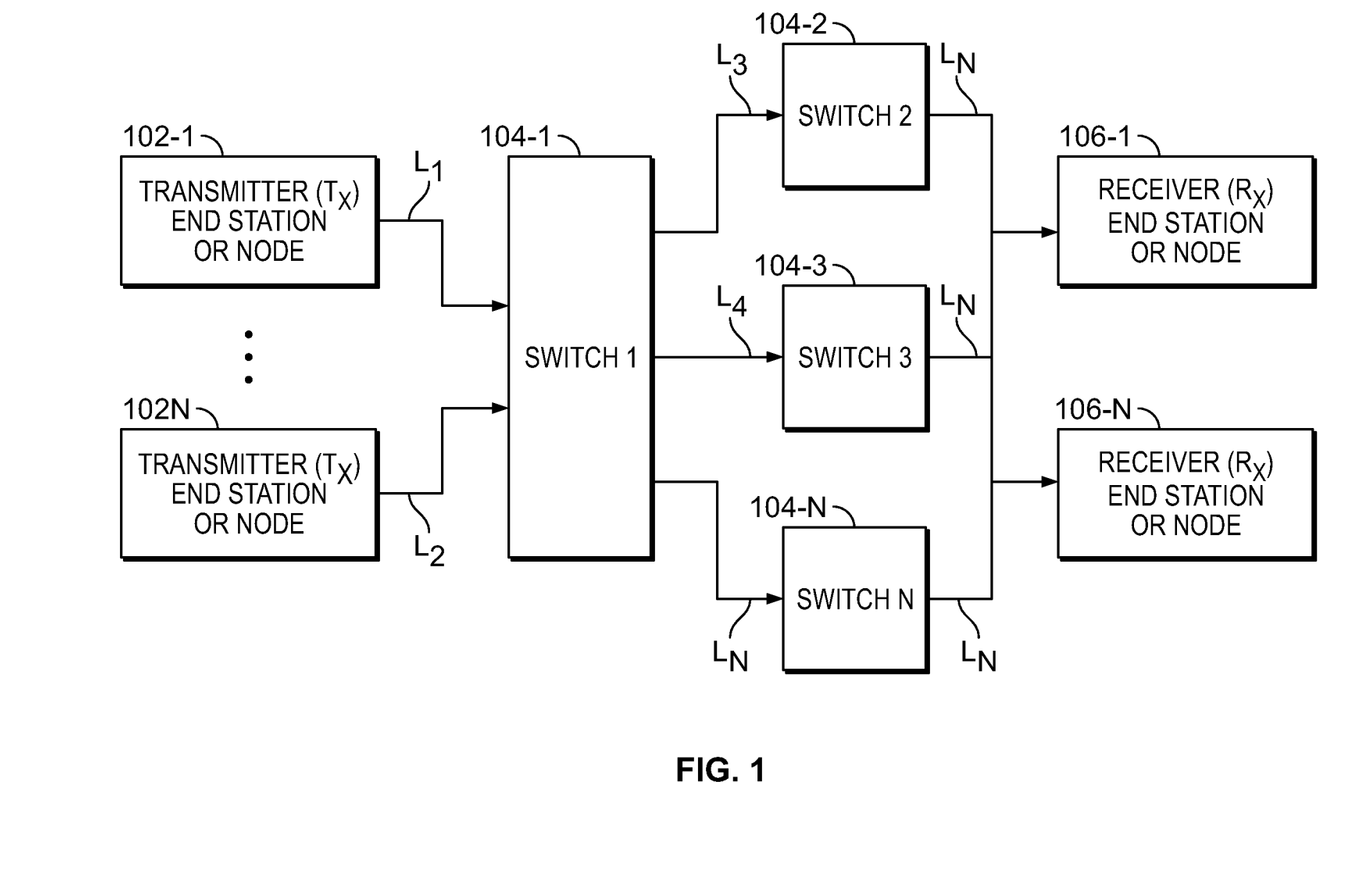
FIG. 1 is a functional block diagram illustrating one embodiment of an exemplary network in accordance with exemplary embodiments.

FIG. 1 is a block diagram of one embodiment of an exemplary network 100. The network 100 includes a plurality of end stations 102 and 106 (also referred to herein as "nodes") and a plurality of switches 104. As used herein, both switches and end stations can be referred to as nodes. Node 102 is designated as a transmission node, and nodes 106-1 . . . 106-N are designated as reception nodes to which a transmitted message from the end station (or node 102) is directed. As used herein, a 'Virtual Link (VL)' defines traffic flow from a single transmitting end station (or node 102) to one or more reception nodes 106. For example, a VL may refer to a VL as defined in ARINC 664 part 7. In addition, as used herein, a 'network plane' refers to a disjoint or distinct path from a single transmitting port in a transmitting node 102 to the one or more reception nodes 106 of the Virtual Link. Since all paths in FIG. 1 from the transmitting node 102 to the reception nodes 106-N include a switch 104-1, FIG. 1 depicts only a single network plane. Although FIG. 1 only depicts a single network plane for purposes of explanation, it is to be understood that multiple network planes can be included in network 100 to provide data path redundancy in other embodiments.

The network 100 can be implemented using suitable hardware and protocols which can be configured to support one or more of the functions described herein. For example, the embodiments described herein are implemented using the TTE protocol and compatible hardware as defined in the SAE AS6802 standard for purposes of explanation. However, it is to be understood that other hardware and protocols can be used in other embodiments. For example, other exemplary network implementations include, but are not limited to, ethernet-based networks, including Avionics Full-Duplex Switched (AFDX) Ethernet defined in the ARINC 664 Part 7 standard and non-Ethernet based store and forward networks. As used herein, the ethernet refers to the family of protocols defined in the IEEE 802.3 standard. Also, it is to be understood that multiple network protocols can be used together in some embodiments. For example, in some embodiments, a Network Scheduling and Configuration Tool (referred to herein as NST) is configured to enable scheduling a TTE schedule on top of an already existing AFDX schedule, thereby integrating or combine the schedules.

The NST is used to schedule transmission of messages (also referred to herein as frames) through network 100 and determine other configuration parameters for the operation of network 100. The NST need not be one of the end stations 102, 106, or switches 104 in network 100.

Figure 2:
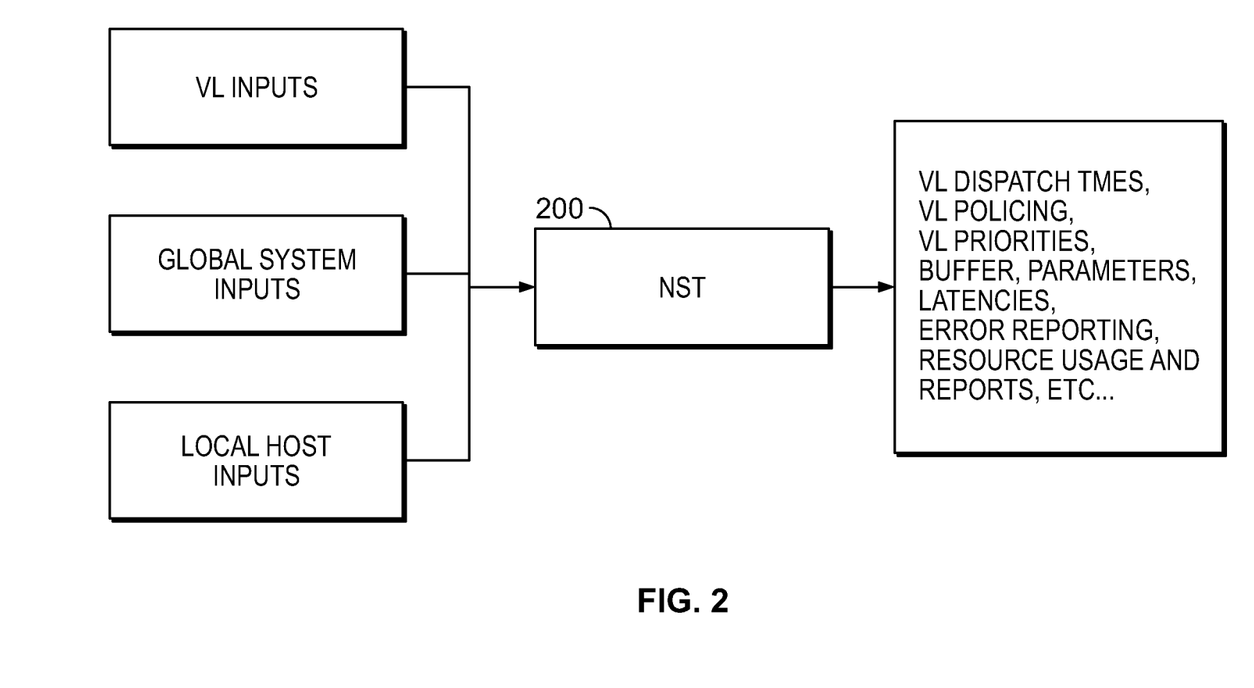
FIG. 2 is a functional block diagram illustrating the use of embodiments of the network scheduling and configuration tool (NST) in accordance with exemplary embodiments.

FIG. 2 depicts exemplary inputs for use by embodiments of the NST 200 and exemplary schedule and configuration parameters output by the NST 200. In particular, the exemplary inputs include VL inputs, global system inputs, and localhost inputs. The VL inputs for each VL can include the VL identification number, the source network interface card (NIC) (i.e., end stations 102 and 106), the set of reception nodes, routing information, payload size, traffic class, transmit rate, and schedule type of a fast pass or a normal pass scheduling. The fast pass scheduling, also called sub-period scheduling, attempts to schedule a VL transmission after the producer has written the VL into the egress buffer. Before the earliest consumer expects to read the VL from the ingress buffer, guaranteeing a network latency less than the VL period. The normal pass scheduling, also called super-period scheduling, attempts to schedule a VL transmission after the latest consumer has read the VL from the ingress buffer. Before the producer expects to produce a new sample of the VL, guaranteeing a network latency is more significant than the VL period.

The global system inputs can include information regarding synchronization flows between timing masters and compression masters as defined in SAE AS6802, and system configuration constants (e.g., precision constant, inter-frame gap (IFG), etc.). The local host inputs can include producer or transmitting node write frame rate, producer time frame offset definition, consumer or reception node read frame rate, consumer time frame offset definition, producer buffer, and consumer buffer models (e.g., single transmit buffer, VL queue, direct memory access (DMA), First-in-First-out, etc.) Details regarding exemplary local host inputs are described in more detail below.

The exemplary output scheduling and configuration parameters can include VL dispatch times, VL policing parameters, VL priorities, buffer parameters, latencies, error reporting, resource usage, reports, etc. For example, the NST 200 can calculate the schedule for VL dispatch times and arrival windows based on message rates and timing constraints. Additionally, the NST 200 can set bandwidth allocation gap (BAG) for bandwidth policing per ARINC 664, policing (jitter) values, assign VL priorities based on rates, determine buffer types and size allocations in end stations and switches, determine resource usage and reports (such as but not limited to, link utilizations, time slots spare efficiency, buffer utilization, etc.), and provide error and warning reports (such as but not limited to schedulable actions, buffer overruns, etc.) The NST 200 can also determine end-to-end data latencies and jitter between end stations and provide timing reports for a global timeline and a local timeline for every switch and end station dispatch port. Additional details regarding the schedule and configuration parameters output by the NST 200 are described in more detail below.

Figure 3:
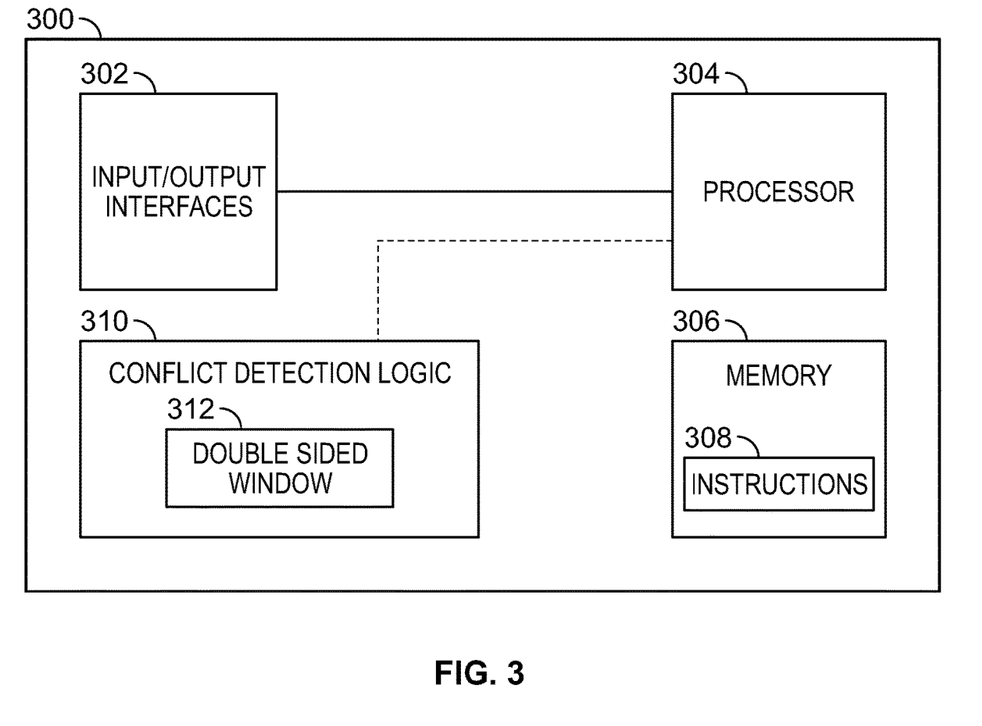
FIG. 3 is a functional block diagram illustrating components of an exemplary NST in accordance with exemplary embodiments.

FIG. 3 illustrates a processing unit, memory, and interface of an exemplary NST in accordance with an embodiment. The NST 300 includes an input/output interface 302, a processing unit 304, and a memory 306. Network scheduling instructions 308 are stored in memory 306. The processing unit 304 includes or functions with software programs, firmware, or other computer-readable instructions (e.g., network scheduling instructions 308) for carrying out various methods, process tasks, calculations, and control functions, used in performing the functions described herein, such as scheduling the multiple classes of frames.

These instructions are typically stored on any appropriate computer-readable medium used to store computer-readable instructions or data structures. The computer-readable medium can be implemented as any available media that can be accessed by a general-purpose or special-purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read-Only Memory (ROM), Electrically Erasable Programmable ROM (EEPROM), flash memory, Solid State Drives (SSD), etc.

By executing the network scheduling instructions 308, the processing unit 304 computes network configuration and scheduling tables, output via the input/output interface 302. The network scheduling instructions 308 are configured to cause the processing unit 304 to implement some or all of the techniques described herein to compute the configuration and schedule tables. The configuration and schedule tables can be loaded into the various nodes (e.g., end stations and switches) of the network for managing the frames that flow through the network. Hence, the NST 300 need not be implemented as a node in the network.

The NST includes conflict detection logic 310 with a double-sided timing window 312 for resolving a physical resource conflict between the VL that is scheduled and each VL already scheduled in the bin.

For example, the configuration and scheduling tables allow both Rate Constrained (RC) and Time-Triggered (TT) scheduling parameters of the AS6802 and the ARINC 664 part 7 protocols. That is, a controlled traffic frame arriving at an input port of a switch, for example, may be transmitted from a dispatch/output port of the switch using the TT scheduling protocol on some output ports and the RC scheduling protocol on other ports, regardless of how the arriving frame was classified on arrival at the input port. In other words, the frame may arrive at the input port as a TT or RC frame. Additionally, the pattern used to determine the class of an arriving frame is configurable. For example, the same frame may be classified differently in different network units. The same frame may be classified differently at a Tx ES than at a switch or a receiving end station (Rx ES). Different physical links in a VL routing tree can be configured to handle the same frame using different traffic classes. The NST configuration may ensure the desired performance for the TT and RC classes for critical traffic. Also, the NST 300 accommodates Best-Effort (BE) traffic, typically used for non-critical traffic, by allowing a network medium to be shared with safety-relevant traffic flows. The traffic classes supported by the NST are discussed in more detail below.

Multi Rate, Multi Criticality Traffic Scheduling

The NST 300 supports multiple classes of messages. In some embodiments, the traffic class for each respective message or frame is derived from or is a function of the addressing scheme. That is, the traffic class can be based on the VL identification (ID) or destination address. In some embodiments, the NST 300 supports the simultaneous scheduling and configuration of a TT message class, an RC message class, and a BE message class implemented by the underlying network hardware.

TTE integrates traffic of different time-criticality levels into one physical network. The three traffic classes in TTE corresponding to the time-criticality levels. The classes, ordered by decreasing priority of the Time-Triggered (TT), Rate-Constrained (RC), and Best-Effort (BE) traffic. A so-called temporal firewall or partition is employed for the separation of the traffic. The TT messages are sent over the network 100 at predefined times and have a higher priority than RC and BE message types. The occurrence, temporal delay, and precision of TT messages are predefined and guaranteed. The messages have as little delay on the network as possible, and their temporal precision is as accurate as needed based on system configuration. For example, TT messages are tightly coupled to a global timeline or schedule. As used herein, the global timeline refers to a system-wide clock or notion of time, whereas a local timeline refers to the local time maintained by each node. Thus, the dispatch of TT frames, which are tightly coupled, are tied to the global timeline through each transmitting node and switch. Additionally, as used herein, the term 'tightly coupled' means that the transmitting node's dispatch times and switches between the transmitting node and reception nodes are tied to a global timeline. Additionally, it is to be understood that the terms 'timeline' and 'schedule' can be used interchangeably herein.

The RC messages can be used for applications with less strict determinism and real-time requirements than TT messages. The RC messages are guaranteed bandwidth predefined for each application with delays and temporal deviations that have predefined limits. Asynchronous traffic falls within this class. The bandwidth, i.e., payload bytes per period/rate, is guaranteed with a bounded delay/latency to arrive at the receiver, and traffic is not tightly coupled to the global timeline. Thus, in contrast to TT messages, the dispatch times of RC frames, which are not tightly coupled, are not tied to the global timeline but have a bounded window for delivering the frame to the reception nodes.

The BE messages are transported through the network according to conventional Ethernet policy. BE messages are not guaranteed bandwidth, transmit times, limits on maximum delay, or whether the BE messages arrive at the receiver. Essentially, BE messages use the remaining bandwidth of the network after accounting for TT and RC messages and have lower priority than the other two classes of messages.

In some embodiments, the RC messages (also referred to herein as RC frames) satisfy the ARINC specification 664 part 7. The RC frames are queued at dispatch ports (e.g., output ports) in transmitting end stations (TxES) (e.g., node 102) and/or in switches (104-1 . . . 104-N). The RC frames are transmitted according to a priority found in a configuration table computed by the NST 300. In some embodiments, up to eight priority levels are supported by the NST 300.

The RC frames may be policed on arrival at input ports in a switch. For example, the frames can be policed to enforce either rate control in packets per second or bandwidth enforcement in bytes per second. For example, in some embodiments, a token-bucket configured with period and jitter bounds are used. Token-buckets are known to one of skill in the art and, thus, are not described in more detail herein. In some embodiments, the switches are configured to support a fixed number of policing accounts (e.g., each VL being policed is a policing account). For example, in implementations involving AFDX, each VL is monitored at an input port to determine if the number of frames per period complies with the BAG.

The TT messages (also referred to herein as TT frames) are transmitted with a period and offset found in a schedule configuration table with respect to a global timeline. In some embodiments, multiple configurable periods having different respective values can be supported. For example, up to 8 different periods (rates) for TT messages are supported in some embodiments. In such embodiments, the specific value for each of the eight periods is configurable. Alternatively, the specific values for more than eight periods may also be configurable.

Scheduled Rate Constrained Traffic Class

In addition to the traffic classes discussed above, a scheduled rate constrained (SCHRC) "logical" traffic class is created by the NST 300 using TT and RC mechanisms supported by the network hardware, in some embodiments. That is, in calculating the schedule and configuration tables, the NST 300 accounts for SCHRC frames. Handling or scheduling of an SCHRC frame can be considered a hybrid between handling a TT frame and handling a pure RC frame. In particular, whereas TT frames are scheduled on a global timeline, SCHRC frames are scheduled on a local timeline of the respective Tx ES, where the local timeline need not be tied to the global timeline. For example, the same rates/period allowed for TT traffic schedules are also allowed for SCHRC traffic schedules. Additionally, SCHRC VL frames mimic TT VL frames when being scheduled and dispatched from a Tx ES. That is, the SCHRC frames have the same priority as a TT frame when scheduled for dispatch from a Tx ES. However, SCHRC VL frames flow through the $1^{st}$, $2^{nd}$, $3^{rd}$, etc. hop switches to the corresponding Rx ES as an RC frame with lower priority than a TT frame.

Configuration Paradigms

In some embodiments, the routing tables created by the NST 300 configure only the first switch hop to enforce RC BAG/Jitter policies on arrival at the input port. Enforcement of the BAG/jitter policies is disabled at subsequent second hop switches, third hop switches, etc., in such embodiments. The NST 300 can disable BAG/jitter policies for subsequent switches based on the knowledge that the switches are high integrity and fail-passive in some embodiments. Hence, the protection provided by the first hop is sufficient for such implementations.

Thus, in the first configuration option, the TT VL is configured as a TT class of traffic at the dispatch port of the transmitter end station (Tx ES) 102 with the reserve media option enabled and a shuffle time penalty not assumed. Similarly, at each of the switches 104-1 . . . 104-4, the TT VL is configured as a TT class of traffic at the dispatch port of the switches 104 with the reserve media option enabled and a shuffle time penalty not assumed. Thus, the shuffle penalty is not assumed at each of the switches 104. At the input ports of the first switch hop 104-1, the TT VL is configured as a TT class of traffic, and an arrival policing window (e.g., the earliest time of arrival and latest time of arrival) is enforced.

At the input ports of the subsequent switch hops (e.g., switch 104-2, 104-3, and 104-N), the TT VL is configured as RC traffic having the highest available RC class priority (e.g., RC6). The subsequent switches 104-2, 104-3, and 104-N are not configured to enforce BAG or jitter policies. At the input ports of the corresponding receiver end stations (Rx ES) (e.g., Rx ES 106-1 . . . 106-N), the TT VL is configured as a TT class of traffic, and each corresponding Rx ES is configured to perform TT redundancy management.

The NST 300 configures the switch routing tables for routing each TT VL from an input port to one or more output/dispatch ports at every switch between the transmitter end stations (Tx ES) and the Rx ESs, for one or more network planes, using a statically configured path. That is, the same path is used for each frame of the same VL. In some embodiments, the statically configured path is determined using the shortest path algorithm or based on the path having the fewest number of hops. For example, in some embodiments, a Floyd-Warshall algorithm known to one of skill in the art is used.

Parallel Scheduling Capabilities

Figure 4:
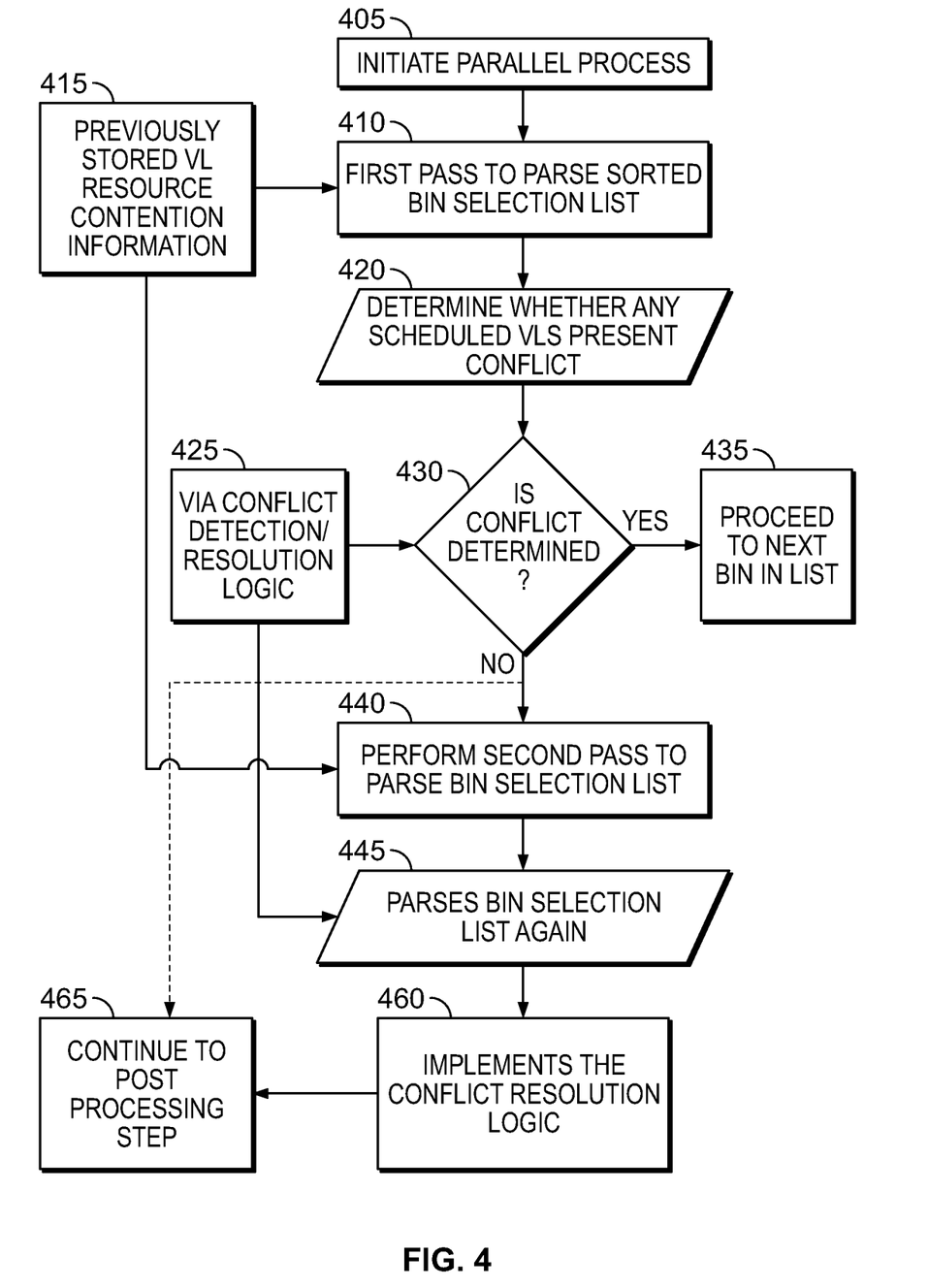
FIG. 4 illustrates a flow diagram that introduces additional data flows and functionality to detect and track physical resource contention for all the VLs in a TTE network prior to scheduling the VLs, in accordance with an embodiment.

FIG. 4 illustrates a flow diagram that introduces additional data flows and functionality to detect and track physical resource contention for all the VLs in a TTE network prior to scheduling the VLs, in accordance with an embodiment. In FIG. 4, the conflict information which has determined (and stored in memory) is retrieved and used in later stages of the scheduling algorithm by the NST to perform a two passing scheduling heuristic that is configured to favor a bin where no previously scheduled VLs conflict with the VL to be scheduled. In FIG. 4, at step 405 to implement the scheduling algorithm configured to favor bins in which the VL to be scheduled contends with no VLs previously scheduled in the bin, the logic performs a two-pass scheduling approach utilizing a specified bin selection heuristic such as a spread-first, stack-first, demand prediction, or any other bin selection approach that is desired for use that provides a list of valid bins based on the time constraints for the VL to be scheduled. At step 410, the first pass parses the sorted bin list through a sorted list of selected bins and examines the VLs already scheduled in each bin using previously stored VL resource contention information 415 (received as input). Next, at step 420, the NST, based on the utilization of the shared VL resource contention, determines if any of the scheduled VLs present conflicts with the VL to be scheduled. If any conflicts are detected at step 430 via implementing the conflict detection logic 425, the NST via the scheduling algorithm proceeds onto the next bin at step 435 in the bin selection list. Alternately, at step 430, if no non-conflicting VLs are identified, the NST schedules in the VL in the bin via the scheduling algorithm, proceeds to the post scheduling step 465, and moves onto the next VL in the sorted VL list. If no non-conflicting bin is found in the first pass through the bin selection list, the NST makes a second pass through the bin selection list at step 440. That is, at step 445, the NST scheduling algorithm parses the bin selection list again in the same order and at step 460, the NST implements conflict resolution logic to offset the VL to be scheduled in time such that the physical resource contention does not cause packet collisions and queuing delays along the route. The flow proceeds to the post scheduling step 465.

Post Scheduling to Enhance Parallelism

Figure 5:
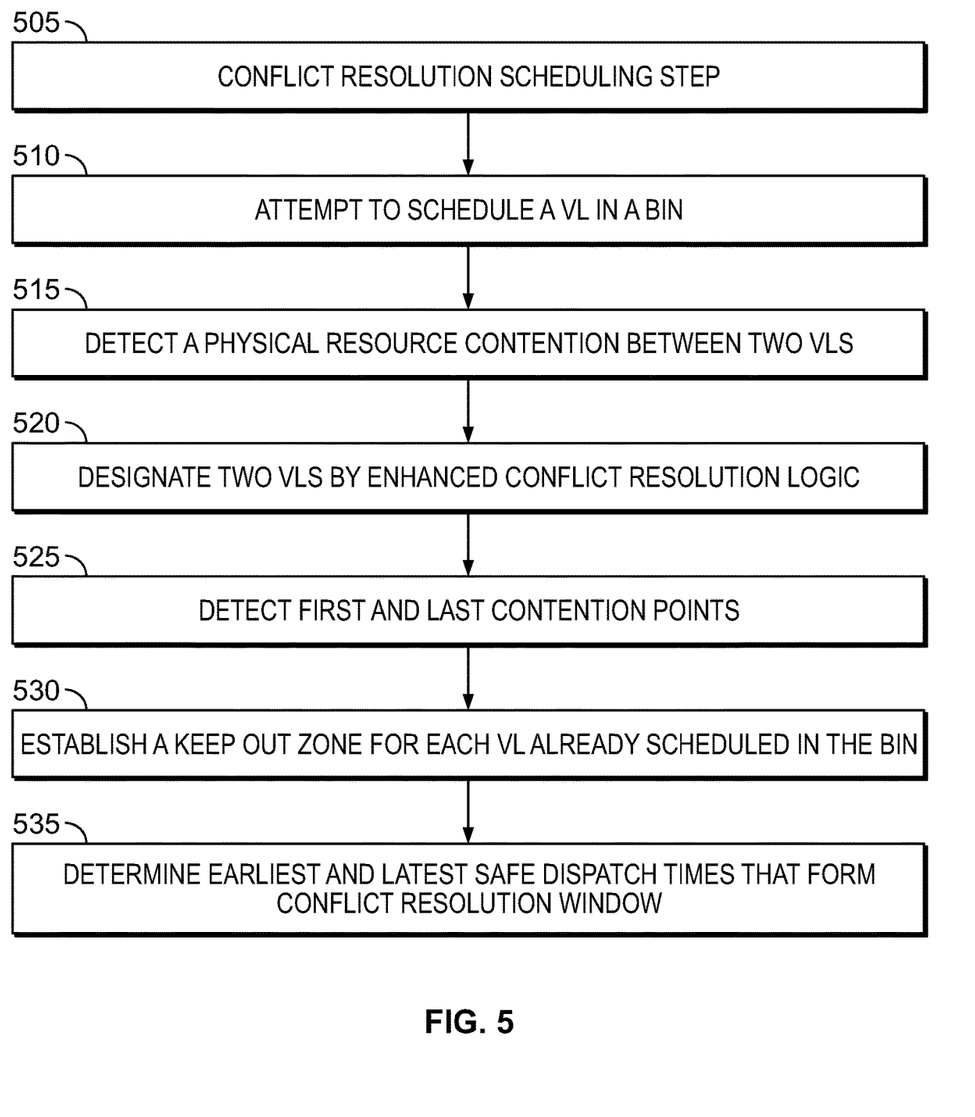
FIG. 5 illustrates a flow diagram of enhanced parallel scheduling capabilities of the NST 300 by introducing temporal conflict resolution logic with two-sided timing windows, in accordance with an embodiment.

FIG. 5 illustrates a flow diagram of enhanced parallel scheduling capabilities of the NST 300 by introducing temporal conflict resolution logic with two-sided timing windows, in accordance with an embodiment. The NST 300 at task 505 initiates a conflict resolution algorithm at step 510, which attempts to schedule a VL in a bin with other VLs already scheduled. The schedule is attempted by detecting a physical resource contention at step 515 between two VLs. The two VLs are designated by the enhanced conflict resolution logic at step 520. The enhanced conflict resolution logic is programmed to determine the earliest and latest arrival times for the two VLs at the conflict point. The two times (earliest and latest) form a VL conflict window and are determined at step 525 by detecting both the first and last resource contention points and consequentially the physical length of the conflicting path on the common route segments shared by the two VLs. The relative size of the VLs, along with best- and worst-case hardware latencies, link propagation times, and synchronization precision are then used to establish at step 530 a keep-out zone for each VL already scheduled in the bin. Relative dispatch timing of the conflicting VL within the bin is then used at step 535 to determine the earliest and latest possible safe dispatch points for the to-be-scheduled VL that form the two sides of the conflict resolution window. The two sides consist of a first and second time where a first time represents a no-later-than constraint and a second time represents a no-earlier-than constraint. The no earlier and no later than constraints are time values which the VL to be scheduled can be transmitted from the source to the end of the TTE network in which the VL to be scheduled to pass by a point of the resource contention before the already-scheduled VL has not passed by the point of resource contention or the already-scheduled VL has passed by the point of resource contention before the VL to be scheduled. The configured resultant conflict resolution window can be considered a two-sided window that is collected or designated for each VL that is already scheduled in the bin, and the algorithm uses the aggregate two-sided constraint to determine where in the bin the VL to be scheduled can be safely placed to resolve all physical resource contention within the bin. If the no-later-than constraint occurs before the start of the bin or the no-earlier-than constraints occurs too close to the end of the bin to allow the VL to traverse its entire route, the VL cannot be placed in the bin.

In various exemplary embodiments, the enhanced conflict detection logic implements the double-sided timing window (i.e., a transmit-no-later-than time and a transmit-no-earlier-than time) to potentially resolve physical resource conflicts between the VL to be scheduled and each VL already scheduled in the bin. The NST 300 then uses the aggregate non-conflicting timing windows between a to-be-scheduled VL and all previously scheduled VLs within a bin to determine where in the bin the VL can be safely placed.

Intelligent Switch Buffering Management

Figure 6:
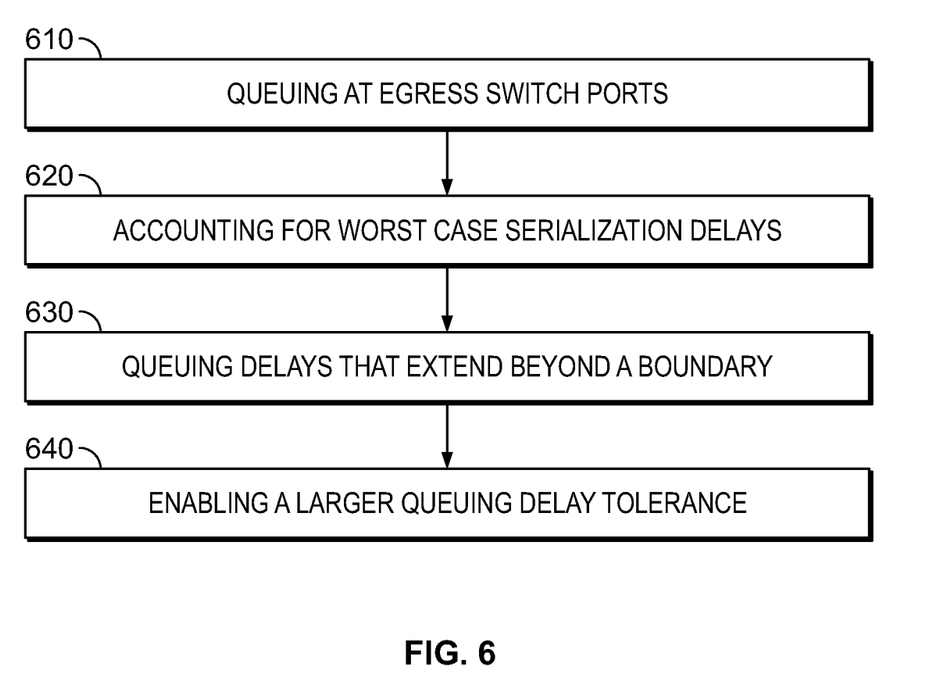
FIG. 6 illustrates an exemplary flow diagram of enabling a feature for intelligent switch buffering management of the NST implementation of the scheduling algorithm in accordance with an exemplary embodiment.

FIG. 6 illustrates an exemplary flow diagram of enabling a feature for intelligent switch buffering management of the NST implementation of the scheduling algorithm in accordance with an exemplary embodiment. In FIG. 6, the NST 300 implements the scheduling algorithm that selectively excludes destination port conflicts in the conflict detection logic. This capability is enabled by the scheduling algorithm allowing at step 610 for queuing to occur at egress switch ports that are servicing a destination end system while preserving the high-fidelity conflict detection and resolution at switch interlink ports. The scheduling algorithm at step 620 is configured for considering or accounting for the occurrences of a worst-case serialization delay based on the link rate at the egress port, existing scheduled traffic, and proximity to the end of the bin. At step 630, if the VL causes a queuing delay that extends beyond the bin boundary, the NST's scheduling algorithm does not schedule the VL in the bin. In an exemplary embodiment, the scheduling algorithm at step 640 is enabled for allowing or enabling a larger queuing delay tolerance where the final VL is initiated but not completed, resulting in a worst-case serialized transmission to the destination end system that completes after the end of the bin. The maximum queuing delay introduced by this feature is accounted for in the configured worst-case end-to-end latency calculation for each VL that is queued by this feature.

Figure 7:
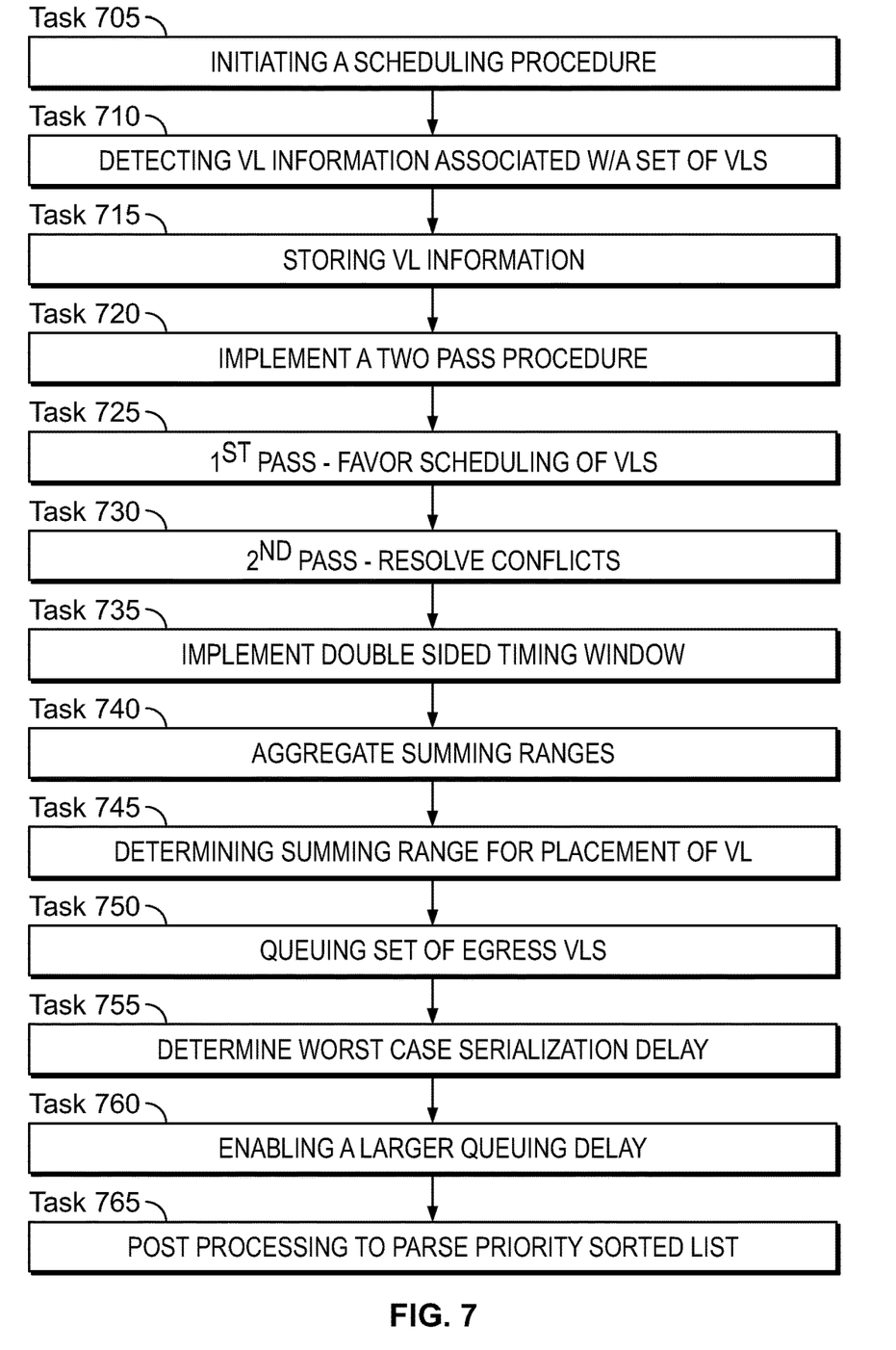
FIG. 7 is an exemplary flowchart that illustrates the pre-processing a scheduling of Virtual Links (VLs) contained in a Time-Triggered Ethernet (TTE) network in predefined priority order for use by a Network Scheduling Tool (NST), in accordance with an embodiment.

FIG. 7 is an exemplary flowchart 700 that illustrates the pre-processing a scheduling of Virtual Links (VLs) contained in a Time-Triggered Ethernet (TTE) network in predefined priority order for use by a Network Scheduling Tool (NST), in accordance with an embodiment.

At task 705, the pre-processing is implemented by the scheduling algorithm of the NST 300 using VL information prior to initiating a scheduling procedure for a group or set of VLs. At task 710, VL information associated with the set of VLs that utilize one or more common physical resources of the TTE network is detected. The common physical resources include a common direction of a switching port or an egress end system port. At task 715, the VL information associated with the set of VLs in memory is stored for retrieval by the NST and used in parsing a VL list to determine which VLs are conflicted when implementing various functionalities during the scheduling procedure. At task 720, a two-pass procedure is performed by the scheduling algorithm to identify and prioritize a physical resource contention between any set of VLs. At task 725, the scheduling algorithm performs a first pass of the two-pass procedure of the set of VLs that attempts to favor scheduling of a VL into a bin where previously scheduled VLs fail to exhibit conflicts with the VL that is to be scheduled. At task 730, if no non-conflicting bin was found for the VL to be scheduled, the scheduling algorithm performs a second pass of the two-pass procedure to parse the bin list in the same order. The second pass attempts to resolve at least one conflict exhibited in the scheduling procedure by offsetting a transmit time of the VL that is to be scheduled.

At task 735, the conflict detection logic of the NST 300 uses a double-sided timing window to resolve a physical resource conflict between the VL that is to be scheduled and each VL already scheduled in the bin. The double-sided timing window includes a transmit range defined by a transmit-no-later-than time and a transmit-no-earlier-than time.

At task 740, the scheduling algorithm aggregates various different (i.e., a plurality) summing ranges. Each of the summing ranges is defined by a set of aggregated non-conflicting timing windows between a VL that is to be scheduled and a set including previously scheduled conflicting VLs within a bin.

At task 745, the scheduling algorithm determines in each summing range a location for placement of the VL that is to-be-scheduled within the bin. At task 745, the scheduling algorithm excludes any destination ports with conflicts determined by the conflict detection logic. At task 750, in response to the exclusion of conflicting destination ports, the scheduling algorithm queues a set of egress VLs at switch ports to service a destination end system while the algorithm preserves a high-fidelity conflict detection and resolution which pertains to each set of switch interlink ports.

At task 755, the scheduling algorithm determines a worst-case serialization delay based on a link rate at an excluded conflicted destination port of approximately all existing scheduled traffic at a specific port in the bin, which is at proximity to an end of the bin. If the scheduled VL causes a queuing delay extending beyond a bin boundary, then the algorithm does not proceed to schedule the VL within the bin. At task 760, the scheduling algorithm allows a tolerance of a larger queuing delay if the scheduling of a serialized transmission to a destination end system of a final VL that is scheduled at the end of a bin has already been initiated but has yet been completed.

At task 765, a post-scheduling step is implemented by the NST to parse a priority-sorted list for discovering a VL of a set of VLs that do not conflict with a just scheduled VL or any previously scheduled VLs within the bin, wherein the scheduling algorithm places any non-conflicting VLs in the same bin as the just-scheduled VL if the bin represents a valid placement for the VL based on input system timing constraints.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general-purpose processor, a digital signal processor (DSP), an application-specific integrated circuit (ASIC), a field-programmable gate array (FPGA) or other programmable logic devices, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc., simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. A method for pre-processing scheduling of Virtual Links (VLs) contained in a Time-Triggered Ethernet (TTE) network in predefined priority order for use by a Network Scheduling Tool (NST), the method comprising:
   pre-processing, by a scheduling algorithm implemented by the NST, VL information prior to initiating a scheduling procedure of a set of VLs, the pre-processing by the scheduling algorithm by the NST comprising the steps of:
   detecting VL information associated with the set of VLs that utilize one or more common physical resources of the TTE network wherein the one or more common physical resources at least comprise a common direction of a switching port or an egress end system port;
   storing the VL information associated with the set of VLs in a memory for retrieval by the NST to parse a VL list for scheduling by the scheduling algorithm to determine one or more conflicting VLs in functionalities during the scheduling procedure;
   scheduling a first pass of a two-pass procedure of the set of VLs that attempts to favor scheduling a VL into a bin when a previously scheduled VL fails to exhibit conflicts with the VL that is scheduled; and
   scheduling a second pass of the two-pass procedure of the set of VLs that attempts to resolve at least one conflict exhibited in the scheduling procedure by offsetting a transmit time of the VL that is scheduled.

2. The method of claim 1, further comprising:
   performing the two-pass procedure of the set of VLs by the scheduling algorithm for identifying and prioritizing a physical resource contention between the set of VLs.

3. The method of claim 2, further comprising:
   configuring the NST with conflict detection logic comprising a double-sided timing window for resolving a physical resource conflict between the VL that is to be scheduled and each VL already scheduled in the bin.

4. The method of claim 3, wherein the double-sided timing window comprises a transmit range defined by a transmit-no-later-than time and a transmit-no-earlier-than time.

5. The method of claim 4, further comprising:
   aggregating a plurality of summing ranges wherein each summing range is defined by a set of aggregated non-conflicting timing windows between a VL that is to be scheduled, and a set comprising previously scheduled conflicting VLs within the bin.

6. The method of claim 5, further comprising:
   determining in each summing range, a location for placement of the VL that is to be scheduled within the bin.

7. The method of claim 6, further comprising:
   excluding one or more destination ports with conflicts determined by the conflict detection logic.

8. The method of claim 7, further comprising:
   in response to excluding conflicted destination ports, queuing a set of egress VLs at switch interlink ports for servicing a destination end system while preserving a high-fidelity conflict detection and resolution pertaining to each set of switch interlink ports.

9. The method of claim 8, further comprising:
   determining a worst-case serialization delay based on a link rate at an excluded conflicted destination port, of approximately all existing scheduled traffic at a specific port in the bin which is at proximity to an end of the bin wherein if a scheduled VL causes a queuing delay extending beyond a bin boundary, then not proceeding to schedule the VL within the bin.

10. The method of claim 9, further comprising:
    allowing a tolerance of a larger queuing delay if the scheduling of a serialized transmission to a destination end system of a final VL that is scheduled at an end of the bin has already been initiated but has yet been completed.

11. The method of claim 10, further comprising:
    post-scheduling by parsing a priority-sorted list for discovering a VL of a set of VLs that do not conflict with a just scheduled VL or any previously scheduled VLs within the bin, wherein the scheduling algorithm places any non-conflicting VLs in a same bin as a just-scheduled VL if the bin represents a valid placement for the VL based on input system timing constraints.

12. A system for pre-processing scheduling of Virtual Links (VLs) contained in a Time-Triggered Ethernet (TTE) network in predefined priority order for use by a Network Scheduling Tool (NST),
    wherein the NST comprises:
    one or more processors to pre-process VL information prior to initiation of a scheduling procedure of a set of VLs to:
    one or more processors to detect VL information associated with the set of VLs that utilize one or more common physical resources of the TTE network wherein the one or more common physical resources at least comprise a common direction of a switching port or an egress end system port;

one or more processors to store the VL information associated with the set of VLs in a memory for retrieval by the NST to parse a VL list for scheduling by the scheduling algorithm to determine one or more conflicting VLs in functionalities during the scheduling procedure; and one or more processors to perform a two-pass procedure by the scheduling algorithm to identify and prioritize a physical resource contention between the set of VLs wherein a first pass of the two-pass procedure attempts to favor to schedule a VL into a bin when all previously scheduled VLs fail to exhibit a conflict with the VL that is to be scheduled wherein a second pass of the two-pass procedure for a set of VLs attempts to resolve any conflicts by an offset of a transmit time of the VL that is to be scheduled.

13. The system of claim 12,
wherein the NST further comprises:
one or more processors to implement conflict detection logic which comprises a double-sided timing window for resolving a physical resource conflict between the VL that is to be scheduled and each VL already scheduled in the bin wherein the double-sided timing window comprises a transmit range defined by a transmit-no-later-than time and a transmit-no-earlier-than time; and one or more processors to aggregate, by the scheduling algorithm, based on a sum of ranges defined by aggregated non-conflicting timing windows between a VL that is to be scheduled, and approximately all of the previously scheduled and conflicted VLs within the bin that determines a location for placement of the VL in the bin.

14. The system of claim 13,
wherein the NST further comprises:
one or more processors to exclude, by the scheduling algorithm, one or more destination ports with conflicts via the conflict detection logic;

in response to excluding conflicted destination ports, one or more processors to queue by the scheduling algorithm of a set of egress VLs at switch interlink ports to service a destination end system and to preserve a high-fidelity conflict detection and a resolution which pertains to each set of switch interlink ports;

one or more processors to determine, by the scheduling algorithm, a worst-case serialization delay based on a link rate at an excluded conflicted destination port, of approximately all existing scheduled traffic at that specific port in the bin which are in proximity to an end of the bin wherein if the to be scheduled VL causes a queuing delay which extends beyond a bin boundary, then not continuing to schedule the VL in the bin; and one or more processors to allow, by the scheduling algorithm, a tolerance of a larger queuing delay if a schedule of a serialized transmission to a destination end system of a final VL that is to be scheduled at an end of a bin has already been initiated but has not yet been completed.

15. The system of claim 14,
wherein the NST further comprises:
one or more processors to post-schedule, by the scheduling algorithm, to parse a priority-sorted list to determine a VL of a set of all VLs that are not conflicted with a just scheduled VL or any previously scheduled VLs in the bin, wherein the scheduling algorithm places any non-conflicting VLs in a same bin as a just-scheduled VL if the bin represents a valid placement for the VL based on input system timing constraints.

16. An apparatus comprising a network scheduling tool (NST) for pre-processing scheduling of Virtual Links (VLs) contained in a Time-Triggered Ethernet (TTE) network in predefined priority order for use by a Network Scheduling Tool (NST), comprising:

the NST is configured with a processor programmed by a set of instructions to schedule time-triggered traffic by:
pre-processing, by a scheduling algorithm of the NST, VL information prior to initiating a scheduling procedure of a group of VLs;

detecting VL information associated with the group of VLs that utilize one or more common physical resources of the TTE network wherein the one or more common physical resources at least comprise a common direction of a switching port or an egress end system port;

storing the VL information associated with the group of VLs in a memory for retrieval by the NST to parse a VL list for scheduling by the scheduling algorithm to determine one or more conflicting VLs in functionalities during the scheduling procedure; and performing a two-pass procedure by the scheduling algorithm for identifying and prioritizing a physical resource contention between a set of VLs by scheduling a first pass of the two-pass procedure of the set of VLs that attempts favoring scheduling a VL into a bin when previously scheduled VLs fail to exhibit conflicts with the VL that is to be scheduled, and by scheduling a second pass of the two-pass procedure of the set of VLs that attempts to resolve at least one conflict exhibited in the scheduling procedure by offsetting a transmit time of the VL that is to be scheduled.

\* \* \* \* \*